No. 891,589. PATENTED JUNE 23, 1908.
W. L. BLISS.
AUTOMATIC ELECTRIC REGULATOR.
APPLICATION FILED AUG. 24, 1904.
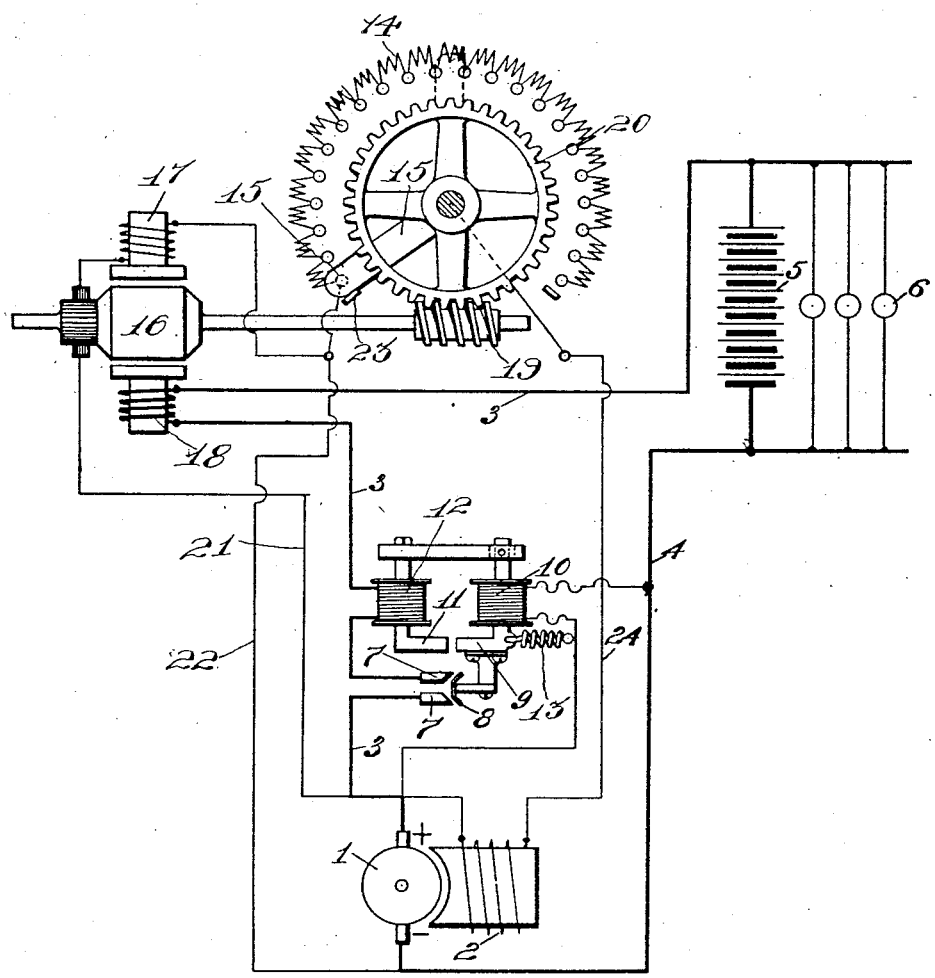
WITNESSES:
INVENTOR.
William L. Bliss.
BY: Jones & Addington
ATTORNEYS.

UNITED STATES PATENT OFFICE.

WILLIAM LORD BLISS, OF NEW YORK, N. Y.

AUTOMATIC ELECTRIC REGULATOR.

No. 891,589.

Specification of Letters Patent.

Patented June 23, 1908.

Application filed August 24, 1904. Serial No. 222,019.

*To all whom it may concern:*

Be it known that I, WILLIAM LORD BLISS, a citizen of the United States, residing at New York, in the county of Kings and State of New York, have invented new and useful Improvements in Automatic Electric Regulators, of which the following is a full, clear, concise, and exact description, reference being had to the accompanying drawing, forming a part of this specification.

The present invention relates to improvements in automatic electric regulators, the object thereof being to provide a regulator of this character which may be employed for regulating a generator to confine the output thereof within certain limits, where said generator operates under such conditions that the electromotive force developed thereby tends to vary.

The present invention has been illustrated in the accompanying drawings, as embodied in a car lighting system wherein the generator which furnishes the current for operating translating devices and charging a storage battery receives the power for operating the same from the motion of the car or train.

The invention has been illustrated in this way merely for the purpose of explaining the same and, therefore, it will be understood that it may be applied to other purposes and embodied in various forms.

In accordance with the present invention, in the preferred form thereof, an electric motor serves to operate the regulator, said motor having associated therewith means which may automatically cause the direction of operation of said motor to reverse.

In the system of car lighting illustrated in the drawings, a generator having an armature 1, and a field 2, delivers current through a suitable supply circuit, having mains 3 and 4, to a storage battery 5 and translating devices 6, said translating devices and said storage battery being connected in parallel with the generator. The armature of the generator may be geared to an axle, or in any other way arranged upon the car or train so as to have motion imparted thereto from the motion of the car or train. The generator being operated in this way, the voltage thereof will tend to vary as the speed of the car or train varies, and, consequently, it is necessary to regulate the same to confine the output thereof within certain limits.

The supply circuit may be controlled by an automatic switch, which may have stationary contacts 7, 7, connected in the supply circuit and a movable contact 8 adapted to bridge said stationary contacts to close the supply circuit. The movable contact of the switch may be carried by a pivoted magnet 9 having a winding 10 of fine wire connected in shunt across the supply circuit, said magnet being movable relatively to a stationary magnet 11, having a winding 12 of coarse wire connected in series in the supply circuit. When the generator develops a certain voltage, as, for instance, a voltage equal to that of the battery, sufficient current will traverse the shunt winding 10 to excite the pivoted magnet 9. As said pivoted magnet 9 will then be attracted towards the stationary magnet 11, the movable contact 8 will be brought into engagement with the stationary contacts 7, 7, and thus close the circuit from the generator to the battery and translating devices. The stationary magnet will now be excited by current flowing through the winding 12. While the generator voltage remains in excess of the battery voltage, the stationary magnet and the pivoted magnet will coöperate in keeping the switch closed, but when the generator voltage falls below the battery voltage, the stationary magnet 11 will become excited by current from the battery flowing backward through the winding 12, and then as said stationary magnet and said pivoted magnet will oppose each other, the polarity of the magnet 11 having been reversed; the pivoted magnet 9 will be withdrawn from the stationary magnet 11 by the spring 13. After the automatic switch thus opens the supply circuit, the battery cannot discharge through the generator.

The generator may be regulated by a rheostat having a resistance 14 and a movable arm 15, suitable contacts being provided over which said arm may be moved to vary the resistance included in the field circuit of the generator. This arm may be operated by an electric motor having an armature 16 and field windings 17 and 18, said motor being connected with said arm through a worm 19 mounted upon the shaft of the motor armature and a gear 20 attached to said arm, or in any other suitable way. The field windings of the motor are adapted to act differentially, that is, said windings are adapted to produce opposite magnetizing effects. The armature of the motor and the field winding 17 thereof may be connected by conductors 21 and 22 across the supply circuit in series with each other and in parallel with the battery and translating devices, the other field winding 18 being connected in the supply circuit in series with the battery and translating devices. Instead of the field of the motor having windings adapted to act differentially, the armature thereof may have windings adapted to act in a similar manner.

While the car is at rest or is running at a low speed, the generator will be inoperative, and then the battery will furnish the current for operating the translating devices. When the car or train runs at sufficient speed for the generator to develop a voltage, for instance, equal to that of the battery, the automatic switch will close and then the circuit will be completed from the generator through the supply main 3, translating devices 6 and the supply main 4, back to the generator. While the voltage developed by the generator and that of the battery remain substantially equal, the generator and the battery will together furnish the current for operating the translating devices, but when the voltage developed by the generator exceeds that of the battery, the generator will furnish sufficient current to operate the translating devices and also charge the battery. The current then delivered by the generator may flow from the generator through supply main 3, then dividingly through the battery 5 and translating devices 6, and then after reuniting in the supply main 4, returns to the generator.

After the automatic switch closes, the field winding 18 will be traversed by current flowing through the supply circuit to the translating devices, and the armature 16 and the field winding 17 will receive current from the supply circuit through conductors 21 and 22. The arm of the rheostat will then be in its initial position against the stop 23, and current will flow from the generator through the field 2, conductor 24, rheostat arm 15, and conductor 22, back to the generator. Before the generator voltage rises above the battery voltage, the field winding 17 will have a greater magnetizing effect than the winding 18 and then the motor will tend to operate in such a direction that the arm of the rheostat will remain against the stop 23, in which position all the resistance of the rheostat will be removed from the field circuit of the generator. When the generator voltage rises above the battery voltage as the speed of the car increases, the current delivered by the generator will precipitately increase, since the battery will then receive current from the generator. This increase in the current delivered by the generator will cause the magnetizing effect of the field winding 18 to greatly increase until eventually it will produce a greater magnetizing effect than the field winding 17. The motor will thereupon have the direction in which it has been tending to operate reversed, and, consequently, it will commence to operate the rheostat to insert resistance into the field circuit of the generator and thereby decrease the energizing current of the field of the generator. When the field strength of the generator has thus been sufficiently reduced, the output of the generator will be confined to such an extent that the magnetizing effects of the field windings 17, 18, will neutralize each other. The motor will then cease to operate until a further change takes place in the output of the generator, and when such a change does occur, the direction in which said motor may operate will depend upon whether the voltage developed by the generator rises or falls. If the voltage rises, the magnetizing effect of the field winding 18 will predominate and then the motor will operate the rheostat to insert more resistance into the field circuit of the generator, but if the voltage falls the magnetizing effect of the field winding 17 will become greater than the magnetizing effect of the field winding 18, and, consequently, the motor will operate the rheostat to decrease the resistance in the field circuit of the generator. When the speed of the car decreases until the voltage developed by the generator falls below the voltage of the battery, the motor responding to the influence of the winding 17, will operate the rheostat to remove all the resistance from the field circuit of the generator. The automatic regulator operating in this way serves to confine the output of the generator within certain limits, notwithstanding the excessive variation in the speed of the generator.

When the car or train travels at about twenty miles per hour the generator, which may then be driven at five hundred revolutions per minute, may develop a voltage equal to that of the battery which, for instance, may be sixty-four volts. If the speed of the car should increase to about sixty miles per hour the generator would operate at fifteen hundred revolutions per minute. All other conditions remaining the same, the generator operating at this speed would develop about one hundred and ninety-two volts, which would be excessive, but the field strength of the generator is decreased through the agency of the automatic regulator as the speed thereof rises and, therefore, the voltage developed by the generator remains within certain limits which are not excessive.

If the voltage developed by the generator be allowed to increase to about eighty volts at the maximum speed of the car or train, it will have risen sufficiently to force the full charging current through the battery. Accordingly, the automatic regulator may permit such an increase in the voltage developed by the generator.

Having described my invention what I claim as new and desire to secure by Letters Patent is:

In a system of electrical distribution, in combination, a generator having a shunt field winding, a rheostat connected in circuit with said shunt field winding, a main circuit extending from said generator, a storage battery and translating devices connected to said main circuit in parallel, an automatic switch adapted to close said main circuit when the voltage of said generator rises above a certain point and to open said main circuit when the voltage of said generator falls below a certain point, an electric motor for operating said rheostat, said motor having differentially acting field windings, one connected in said main circuit in series, the other field winding of said motor and the armature winding of said motor being connected in series in a shunt circuit extending across said main circuit between said automatic switch and said generator.

In witness whereof, I have hereunto subscribed my name in the presence of two witnesses.

WILLIAM LORD BLISS.

Witnesses:
C. B. C. FOWLER,
J. N. ROBERTSON.